(12) United States Patent
Agiwal et al.

(10) Patent No.: US 10,470,160 B2
(45) Date of Patent: Nov. 5, 2019

(54) METHOD AND DEVICE FOR TRANSMITTING/RECEIVING SIGNAL BETWEEN LINKED DEVICES

(71) Applicant: Samsung Electronics Co., Ltd., Suwon-si, Gyeonggi-do (KR)

(72) Inventors: Anil Agiwal, Suwon-si (KR); Mangesh Abhimanyu Ingale, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/060,719

(22) PCT Filed: Dec. 9, 2016

(86) PCT No.: PCT/KR2016/014447
§ 371 (c)(1),
(2) Date: Jun. 8, 2018

(87) PCT Pub. No.: WO2017/099520
PCT Pub. Date: Jun. 15, 2017

(65) Prior Publication Data
US 2018/0368101 A1    Dec. 20, 2018

(30) Foreign Application Priority Data
Dec. 10, 2015 (IN) .......................... 1268/KOL/2015

(51) Int. Cl.
*H04W 68/00* (2009.01)
*H04W 68/02* (2009.01)
(Continued)

(52) U.S. Cl.
CPC .......... *H04W 68/02* (2013.01); *H04W 68/00* (2013.01); *H04W 76/10* (2018.02); *H04W 8/02* (2013.01);
(Continued)

(58) Field of Classification Search
CPC ...... H04W 68/02; H04W 76/10; H04W 88/04
(Continued)

(56) References Cited

U.S. PATENT DOCUMENTS

2004/0063451 A1    4/2004 Bonta et al.
2007/0249347 A1*  10/2007 Saifullah ............... H04W 36/38
                                                                    455/436
(Continued)

FOREIGN PATENT DOCUMENTS

CN        102625271 A    8/2012
KR    10-2015-0026155 A    3/2015
(Continued)

OTHER PUBLICATIONS

European Search Report dated Aug. 24, 2018, issued in the European Application No. 16873385.5-1214.
(Continued)

*Primary Examiner* — Charles T Shedrick
(74) *Attorney, Agent, or Firm* — Jefferson IP Law, LLP

(57) ABSTRACT

A pre-5G communication system is provided to support a higher data transmission rate higher than that of a 4G communication system such as LTE. A method, for transmitting/receiving a signal between a plurality of linked devices including a first device and a second device, includes allowing the first device to pair with the second device through a near field radio interface, and to share identification information of the second device, allowing the first device to receive from a cellular network through a cellular wireless interface, a paging message including a page record for the second device, and allowing the first device to transmit a page request message to the second device through the near field wireless interface based on the received paging message.

20 Claims, 10 Drawing Sheets

(51) Int. Cl.
*H04W 76/10* (2018.01)
*H04W 8/02* (2009.01)
*H04W 88/04* (2009.01)
*H04W 52/02* (2009.01)

(52) U.S. Cl.
CPC ........ *H04W 52/0229* (2013.01); *H04W 88/04* (2013.01); *Y02D 70/10* (2018.01); *Y02D 70/12* (2018.01); *Y02D 70/126* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/20* (2018.01); *Y02D 70/21* (2018.01); *Y02D 70/26* (2018.01)

(58) Field of Classification Search
USPC ........................................................ 455/458
See application file for complete search history.

(56) References Cited

U.S. PATENT DOCUMENTS

| | | | |
|---|---|---|---|
| 2009/0219844 A1 | 9/2009 | Soliman | |
| 2011/0098043 A1* | 4/2011 | Yu | H04W 60/00 455/435.1 |
| 2011/0134827 A1* | 6/2011 | Hooli | H04W 72/04 370/315 |
| 2011/0256891 A1 | 10/2011 | Soliman et al. | |
| 2011/0294523 A1* | 12/2011 | Ai | H04W 68/02 455/458 |
| 2012/0069827 A1 | 3/2012 | Lee et al. | |
| 2013/0130684 A1* | 5/2013 | Gomes | H04W 8/186 455/435.1 |
| 2013/0183969 A1* | 7/2013 | Kang | H04W 60/02 455/435.1 |
| 2014/0066058 A1* | 3/2014 | Yu | H04L 67/16 455/434 |
| 2015/0156743 A1* | 6/2015 | Lee | H04W 76/14 455/426.1 |
| 2015/0281940 A1* | 10/2015 | Yu | H04W 60/00 455/456.1 |
| 2016/0150350 A1* | 5/2016 | Ingale | H04W 4/70 370/255 |
| 2016/0198518 A1 | 7/2016 | Baek et al. | |
| 2016/0330251 A1 | 11/2016 | Lee et al. | |
| 2016/0366645 A1 | 12/2016 | Song et al. | |
| 2017/0055195 A1* | 2/2017 | Ingale | H04W 36/22 |
| 2018/0077624 A1* | 3/2018 | Jung | H04W 36/03 |
| 2018/0084497 A1* | 3/2018 | Jung | H04W 88/04 |
| 2018/0084523 A1* | 3/2018 | Uchiyama | H04W 68/12 |

FOREIGN PATENT DOCUMENTS

| | | |
|---|---|---|
| KR | 10-2015-0071129 A | 6/2015 |
| KR | 10-2015-0100205 A | 9/2015 |
| WO | 2015-082154 A1 | 6/2015 |

OTHER PUBLICATIONS

Qualcomm Incorporated, Open Issues of UE-to-Network Relay, 3GPP TSG-RAN WG2 Meeting #92, R2-156714, Nov. 7, 2015, Anaheim, California.

European Search Report dated Nov. 19, 2018, issued in the European Application No. 16873385.5-1214.

* cited by examiner

METHOD AND DEVICE FOR TRANSMITTING/RECEIVING SIGNAL BETWEEN LINKED DEVICES

CROSS-REFERENCE TO RELATED APPLICATION(S)

This application is a National Phase Entry of PCT International Application No. PCT/KR2016/014447, which was filed on Dec. 9, 2016 and claims priority to Indian Patent Application No. 1268/KOL/2015, which was filed in the U.S. Intellectual Property Office on Dec. 10, 2015, the entire disclosure of each of these applications is incorporated herein by reference.

TECHNICAL FIELD

The present disclosure relates to a method and device for linking a plurality of cellular devices in a core network of a cellular communication system.

BACKGROUND ART

In order to meet wireless data traffic demands, which have increased since the commercialization of a $4^{th}$-generation (4G) communication system, efforts to develop an improved 5G communication system or a pre-5G communication system have been made. For this reason, the 5G communication system or the pre-5G communication system is called a beyond-4G-network communication system or a post LTE system.

In order to achieve a high data transmission rate, an implementation of the 5G communication system in an mmWave band (for example, a 60 GHz band) is being considered. In the 5G communication system, technologies such as beamforming, massive multi-input multi-output (MIMO), full dimensional MIMO (FD-MIMO), array antenna, analog beam-forming, and large scale antenna technologies are being discussed to mitigate a propagation path loss in the mmWave band and increase propagation transmission distance.

Further, the 5G communication system has developed technologies such as an evolved small cell, an advanced small cell, a cloud radio access network (RAN), an ultra-dense network, device-to-device communication (D2D), a wireless backhaul, a moving network, cooperative communication, coordinated multi-points (CoMP), and received interference cancellation to improve the system network.

In addition, the 5G system has developed advanced coding modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA).

Meanwhile, smart devices, such as smart phones, tablets, smart watches, and wearable devices are showing growth. These smart devices include at least one type of cellular capability, such as 2G-based GSM, 3G-based UMTS/CDMA or 4G-based LTE, WiMAX, and the like. In addition, some of these smart devices are equipped with proximity radio capability (such as Bluetooth, Wi-Fi, etc.) which can operate in unlicensed frequency spectrum of 2.4 GHz or 5.0 GHz. With one or more radio capability equipped on such smart devices, they are able to connect to the internet to gain access to multitude of applications like audio/video streaming, navigation maps, social networking applications, games and plethora of over the top (OTT) services/applications in addition to operator/service provider services. In addition, from a user's point of view, the smart device that the user holds is not limited to one type of smart device, and smart phones, smart watches, tablets or simply a group of smart devices may exist near the user. Further, from user perspective ownership of such smart device is not restricted to one type of smart device where a user owns a smartphone, a smartwatch, a tablet or simply a group of smart devices are always present in the vicinity of the user. When the user is on the move both the operator/service provider services and the OTT services are available independently on the multiple smart devices through the cellular radio interface provided each smart device has independent SIM/USIM.

In addition, if the smart devices are equipped with Wi-Fi radio capability, the smart device can be connected to a wireless LAN (WLAN) access point (AP) to access OTT services. Typically, when a user is located at home, in an office environment, or in a place where the WLAN AP is installed, Wi-Fi-based radio capability are used to access OTT services on the smart device. In this case, operator and service provider services, such as voice calls and SMS, are provided through the cellular capability of the smart device. In addition, it is possible to provide integrated access to the operator's or service provider's cellular network and WLAN APs using the same subscription information stored in the SIM/USIM in the smart device.

The multiple smart devices associated with the same user having cellular radio capability may have individual subscriber identity module (SIM) so that independent data sessions can occur on the radio interface with the cellular network. For ease of handling billing related information and avoiding multiple data plans for multiple devices the user may wish to link the multiple devices so that unified billing and unified data plan is provided by the operator/service provider. The linking of plurality of cellular device(s) in core network can be based on unique identifiers associated with linked devices. Examples of such unique identifiers associated with the devices are: international mobile subscriber identity (IMSI) or international mobile equipment identity (IMEI) or globally unique temporary identity (GUTI). Such linking information of smart devices associated with same user or different users belonging to a group (e.g., family members like husband, wife and children) is typically maintained in the core network primarily in the home subscriber server (HSS) for providing unified billing. The linking information of smart devices can be additionally fetched at other core network elements like mobility management entity (MME) or Policy and charging rules function (PCRF) for other purposes apart from billing.

DETAILED DESCRIPTION OF THE INVENTION

Technical Problem

Multiple smart devices having cellular radio capability belong to the same user. Each of the plurality of smart devices associated with the same user and having cellular radio capability may have an individual SIM and may be linked together in a core network for the integrated data plan and integrated payment purposes. However, these smart devices may have a data session independent of a cellular network and may perform independent procedures in order to perform mobility management and session management. When smart devices have proximity radio capability, such as Bluetooth/Wi-Fi, a plurality of smart devices may be paired with each other based on a proximity interface. When a primary smart device of the plurality of linked devices handles network procedures on behalf of other linked secondary smart devices connected to the primary smart device through the proximity interface, the linking of smart devices in the core network may be used to reduce the signaling overhead associated with procedures which are independently performed by smart devices. When the network procedures are optimally processed as described above, the battery power of the secondary smart devices is significantly reduced and control-plane signaling associated with the mobility management and the session management is reduced. A primary smart device having cellular radio capability may act as a proxy for a plurality of secondary smart devices, so as to perform one or more network procedures such as, monitoring paging, tracking area update, etc., on behalf of secondary smart devices. A data session or a call for a secondary smart device linked to a primary smart device may be terminated at the primary smart device, or may be relayed to the secondary device through the primary smart device.

Technical Solution

In accordance with an embodiment of the present disclosure, a method for transmitting and receiving signals for a plurality of linked devices including a first device and a second device is provided. The method comprises: performing pairing with the second device through a proximity radio interface and sharing identification information of the second device by the first device; receiving a paging message including a page record for the second device from a cellular network through a cellular radio interface by the first device; and transmitting a page request message to the second device through the proximity radio interface on the basis of the received paging message, by the first device.

In accordance with another embodiment of the present disclosure, a method for transmitting and receiving signals for a plurality of devices is provided. The method comprises: linking a first device and a second device to each other on the basis of unique identification information of the first and second devices by a cellular network; preparing a paging message on the basis of a paging record including identification information of the second device by the cellular network; transmitting the paging message to the first device by the cellular network; and receiving a response message from the second device in response to the paging message by the cellular network.

In accordance with yet another embodiment of the present disclosure, a method of transmitting and receiving signals for a plurality of linked devices including a first device and a second device is provided. The method comprises: performing pairing with the first device through a proximity radio interface, by the second device, and sharing identification information of the second device with the first device; turning off a cellular radio capability by the second device; receiving a paging message, which is transmitted from the cellular network and includes a paging record for the second device, from the first device through the proximity radio interface, by the second device; and turning on the cellular radio capability to switch to a connection mode and transmitting a response message to the cellular network in response to the paging message, by the second device.

MODE FOR CARRYING OUT THE INVENTION

Figure 1A:
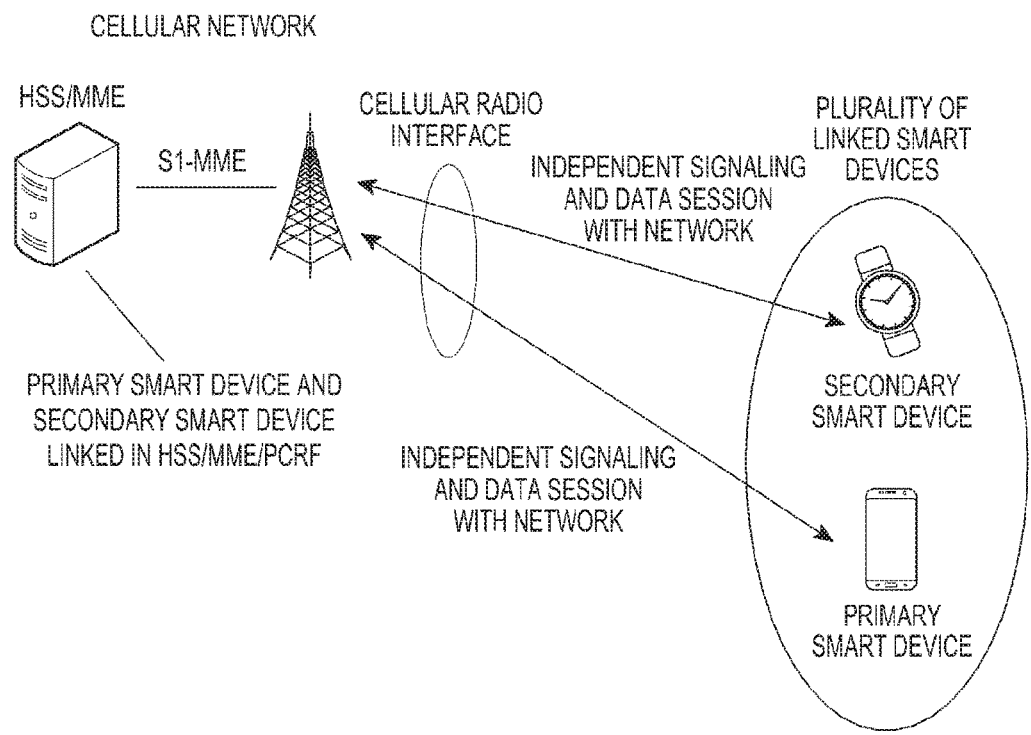
FIGS. 1A and 1B are diagrams illustrating linking of a plurality of smart devices having cellular radio capability according to an embodiment of the present disclosure.

Hereinafter, embodiments of the present disclosure will be described in detail with reference to the accompanying drawings. In the following description, it should be noted that only portions required for comprehension of operations according to the embodiments of the present disclosure will be described and descriptions of other portions will be omitted in order to avoid obscuring the subject matters of the present disclosure obscure. The terms which will be described below are terms defined in consideration of the functions in embodiments of the present disclosure, and may vary depending on users, intentions of operators, or customs. Therefore, the definitions of the terms should be made based on the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, on the contrary, the present disclosure aims to cover all modifications, equivalents, and alternatives falling within the spirit and scope of the disclosure.

Although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure. As used herein, the term "and/or" includes any and all combinations of one or more associated items.

In addition, the terms used herein are used only to describe particular embodiments, and are not intended to limit the present disclosure. As used herein, the singular forms are intended to include the plural forms as well, unless the context clearly indicates otherwise. In the present disclosure, terms such as "include" and/or "have" may be construed to denote a certain characteristic, number, step, operation, constituent element, component or combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in various embodiments of the present disclosure.

According to various embodiments of the present disclosure, an electronic device may include communication functionality. The electronic device may, for example, be a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, or a wearable device (e.g., head-mounted device (HMD), electronic clothing, an electronic bracelet, an electronic necklace, an electronic appcessory, an electronic tattoo, or a smart watch).

According to various embodiments of the present disclosure, the electronic device may be a smart home appliance with communication functionality. The smart home appliance may, for example, be a television, a digital video disk (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the present disclosure, the electronic device may be a medical appliance (e.g., magnetic resonance angiography (MRA) device, magnetic resonance imaging (MRI) device, computed tomography (CT) device, and ultrasonic device), a navigation device, a global positioning system (GPS) receiver, an event data recorder (EDR), a flight data recorder (FDR), an automotive infotainment device, a marine electronic device (e.g., ship navigation device and a gyrocompass), avionics equipment, security equipment, or an industrial or home robot.

According to various embodiments of the present disclosure, the electronic device may be a part of furniture or a building/structure, an electronic board, an electronic signature-receiving device, a projector, and various kinds of measuring instruments (e.g., a water meter, electric meter, gas meter, and electromagnetic wave meter), each of which has communication functionality.

According to various embodiments of the present disclosure, the electronic device may be a combination of the above-mentioned devices. Further, it will be apparent to those skilled in the art that the terminal according to various embodiments of the present disclosure is not limited to the above-mentioned devices.

According to various embodiments of the present disclosure, a terminal (station: hereinafter, referred to as "STA") may be, for example, an electronic device.

In addition, according to various embodiments of the present disclosure, the STA may operate as a signal transmitting device and a signal receiving device, for example, and an access point (hereinafter, referred to as "AP") may operate as a signal-transmitting device and a signal-receiving device, for example. In addition, according to various embodiments of the present disclosure, the AP may operate as a resource operation device, for example.

In addition, according to various embodiments of the present disclosure, a cellular base station (enhanced node B: eNB) may operate as a signal-transmitting device and a signal-receiving device. In addition, according to various embodiments of the present disclosure, the eNB may operate as a resource operation device of a cellular system and a wireless LAN system, for example, and may operate as a device for managing the AP.

Meanwhile, a method and an apparatus proposed by an embodiment of the present disclosure can be applied to mobile broadcasting services including an Institute of Electrical and Electronics Engineers (IEEE) 802.11ac communication system, an IEEE 802.16 communication system, a digital multimedia broadcasting (DMB) service, a digital video broadcasting-handheld (DVP-H) service, and a mobile/portable advanced television systems committee mobile/handheld (ATSC-M/H) service, as well as to various communication systems including a digital video broadcasting system such as an internet protocol television (IPTV) service, a moving picture experts group (MPEG) media transport (MMT) system, an evolved packet system (EPS), a long-term evolution (LTE) mobile communication system, and an LTE-advanced (LTE-A) mobile communication system. A high-speed downlink packet access (HSDPA) mobile communication system, a high-speed uplink packet access (HSUPA) mobile communication, a high rate packet data (HRPD) mobile communication system of $3^{rd}$-generation project partnership 2 (3GPP2), a wideband code division multiple access (WCDMA) mobile communication system of 3GPP2, a code division multiple access (CDMA) mobile communication system of 3GPP2, and a mobile internet protocol (Mobile IP) system.

In the present disclosure, the linking information available in the core network is further exploited to optimize some network procedures in order to reduce signaling overhead and possibly save UE battery power. Most smart devices have proximity connectivity capability like Bluetooth/Wi-Fi to pair with another smart device. It is possible to reduce signaling overhead and minimize power consumption, based on the methods disclosed in the present disclosure, using linking information of smart devices and the proximity connectivity between the linked smart devices. This feature can be implemented such that a linked primary smart device, which is connected to one or more linked secondary smart devices through the proximity interface, serves as a proxy for the linked secondary smart device, thereby performing one or more network procedures on behalf of the linked secondary smart device.

When the primary smart device is registered with a network and the secondary smart device is not registered with the network, a data session or call for the secondary smart device linked to the primary smart device can be terminated at the primary smart device. When the primary smart device is not registered and the secondary smart device is registered, a data session or call can be terminated at the secondary smart device. Among the plurality of devices linked together, the primary and secondary smart devices can be indicated by a user. The data session or call for the secondary smart device linked with the primary smart device can be terminated at the primary smart device if the primary smart device is registered with a network, the secondary smart device is registered with the network and both primary smart device/secondary smart device are in proximity i.e. under same MME or when there is an indication from either of devices to network when they are paired through proximity interface.

The linked primary smart device in the present disclosure is not limited to a smart phone and may include tablet devices, notebook type devices, or other types of smart devices having cellular radio capability, which are designated by a user as a primary smart device. In addition, the linked secondary smart device in the present disclosure is not limited to a smart watch, and may include a wearable device, such as a smart watch, a health band, smart glasses, a smart necklace, or the like, or may include another smart phone or a tablet.

For the convenience of explanation, although the present disclosure has been described in detail and characterized in that a smart phone-type device is referred to as a primary smart device and a wearable type device is referred to as a secondary smart device, the scope of the present disclosure may be equivalently applicable to various scopes of primary smart devices and secondary smart devices referring to some examples described above. Thus, the description of the present disclosure, which refers to a smart phone-type device as a primary smart device and also refers to a wearable type of device as a secondary smart device, should not be construed as limiting the case to which the present disclosure can be applied. In addition, since the proximity interface may be an LTE-based ProSe interface, the proximity radio capability, based on Bluetooth and/or Wi-Fi, with which the primary smart device and the secondary smart device are paired, should not be construed as limiting the applicability of the present disclosure. For the convenience of explanation, the present disclosure is described based on a Bluetooth/Wi-Fi proximity interface. The link between the primary smart device and the secondary smart device in a core network, based on a unique identifier, such as IMSI, IMEI, or GUTI, may be performed based on the unique identifiers or a combination of unique identifiers defined by some other users or operators, and therefore it should not be construed as a limitation on the applicability of the present disclosure.

Hereinafter, with reference to the accompanying drawings, a system and method for performing paging and tracking area update for linked devices according to the present disclosure will be described in detail.

Figure 1B:
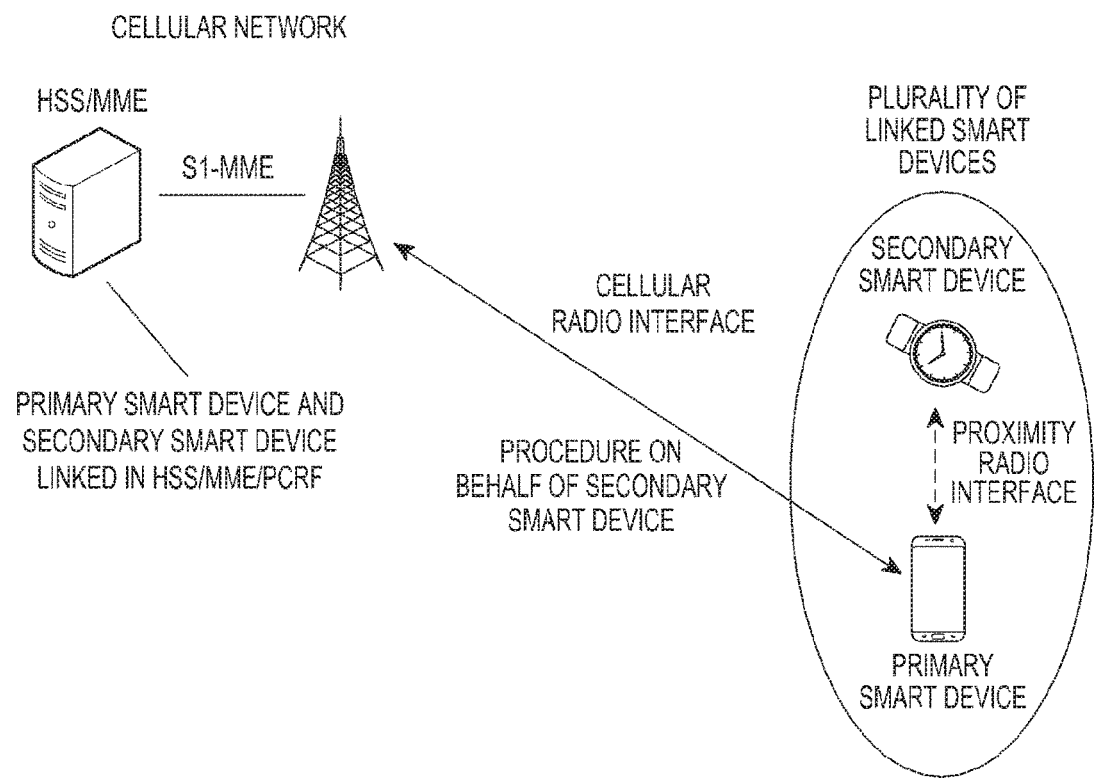

FIGS. 1A and 1B are diagrams illustrating linking of a plurality of smart devices having cellular radio capability connected to a cellular network.

FIG. 1A illustrates a cellular network environment where several smart devices are connected to a cellular network by using cellular radio capability through a cellular radio interface. These smart devices having cellular radio capability may have an individual subscriber identity module (SIM), whereby independent data sessions or calls may be generated in a radio interface with the cellular network. The cellular network includes a plurality of network nodes, such as enhanced NodeB (eNB), which is responsible for radio capability, a mobility management entity (MME), which is responsible for control functions, such as session management and mobility management, a home subscriber server (HSS) for storing subscriber security credentials to perform user authentication, and data gateways, such as a Serving gateway (SGW) and a PDN gateway (PGW), which are responsible for data packet routing between the eNB and an external network. For the explanation of the present disclosure, it is assumed that the cellular network is an LTE-based network including evolved universal terrestrial radio access network (E-UTRAN) and evolved packet core (EPC). The present disclosure is also applicable to a cellular network based on the universal mobile telecommunications system (UMTS) by extending these methods in the context of procedures related to a universal terrestrial radio access network (UTRAN). The present disclosure is also applicable to a cellular network based on a next-generation radio access technology (RAT), a 5G RAT, or NR, by extending these methods in the context of procedures related to the 5G RAT and a core network (CN). The primary smart device and the secondary smart device may be close to each other in a fixed environment, such as a home/office, or in a mobile environment, such as an automobile/bus/train. These devices may perform one or more functions, such as monitoring paging, cell reselection, tracking area update, and the like, triggered in a non-access stratum (NAS) layer, and may independently transmit or receive data packets to or from the cellular network.

In addition, as shown in FIG. 1B, a plurality of smart devices may be connected to other smart devices using proximity radio capability through respective proximity radio interfaces. For the convenience of explanation, the proximity radio interface is assumed to be based on Bluetooth or Wi-Fi, ranging from a few meters to tens of meters, but the present disclosure is also applicable to the case where the proximity interface is based on LTE using the ProSe interface.

FIG. 1B illustrates a network environment wherein it is assumed that a primary smart device having cellular radio capability and proximity radio capability and a secondary smart device having cellular radio capability and proximity radio capability belong to the same user or user group, such as a family including a husband, a wife, and the like. In such a scenario, it is natural to assume that the primary smart device and the secondary smart device belong to the same public land mobile network (PLMN). Since the primary smart device and the secondary smart device belong to the same user or user group, it is expected that these devices are close to each other and belong to the same PLMN. In such a scenario, it seems reasonable to link these devices for ease of handling billing related information and avoiding multiple data plans for multiple devices. The user or a user group may want to link multiple devices to allow the integrated payment and integrated data plan to be provided by the operator/service provider. In a core network, a link between a primary smart device and a secondary smart device may be based on unique identifiers associated with linked devices. Examples of unique identifiers associated with such devices may be an international mobile subscriber identity (IMSI), an international mobile equipment identity (IMEI), or a globally unique temporary identity (GUTI). In an embodiment of the present disclosure, the primary smart device and the secondary smart device are linked to each other based on a unique identifier or a combination of unique identifiers. Such linking information of these smart devices associated with the same user or different users belonging to a user group (e.g., a family including a husband, a wife, and children) is typically maintained mostly in a core network in some other network elements, such as a home subscriber server (HSS), MME, and/or PCRF, and the like. In an embodiment of the present disclosure, the linking information associated with the primary smart device and the secondary smart device may be stored and/or maintained in at least one network element associated with the cellular network.

In addition, since smart devices perform independent functions by using cellular radio capability, battery power is consumed to perform these functions. The primary smart device may be connected to the secondary smart device when the primary smart device is in close proximity for most of the time. Such a scenario is possible when the primary smart device is a smart phone or a tablet and the secondary smart device is a smart watch or wearable device belonging to the same user or a user group. In such a scenario, linking information associated with smart devices can be further exploited to optimize some network procedures in order to reduce signaling overhead and possibly save UE battery power. When the secondary smart device is paired with the primary smart device by using the proximity interface, the cellular radio capability of the secondary smart device may be completely switched off, but the proximity radio capability, such as Bluetooth/Wi-Fi, is activated. As a result, significant power savings for the secondary smart device can be achieved. The power consumption of the secondary smart device can be minimized based on the methods disclosed in the present disclosure wherein the primary smart device having cellular radio capability acts as a proxy for the secondary smart device so as to perform one or more network procedures on behalf of the secondary smart device. In an embodiment of the present disclosure, when a plurality of smart devices having cellular radio capability are linked together, the primary smart device may act as a proxy for at least one secondary smart device of the plurality of linked devices. In an embodiment of the present disclosure, the primary smart device performs one or more network procedures for the secondary smart device. In an embodiment of the present disclosure, one or more network procedures for the secondary smart device, which is performed by the primary smart device, include at least paging monitoring, tracking area update, and the like. Since the primary smart device acts as a proxy for the secondary smart device, the power consumption of the primary smart device may be slightly increased. However, since the primary smart device may have superior capability in terms of the battery source as compared to the secondary smart device, the additional marginal power consumption for the proxy function does not have a negative impact on the power consumption of the primary smart device.

In an embodiment of the present disclosure, the primary smart device may be a multi-subscriber identity module (SIM) device. In an embodiment of the present disclosure, the primary smart device uses a protocol stack corresponding to SIM from the plurality of SIMs such that a PLMN selected by the primary smart device is the same PLMN as the secondary smart device. In an embodiment of the present disclosure, a multi-SIM primary smart device may be acting as a proxy for one or more secondary smart devices on a first SIM and processes a proxy function for one or more secondary smart devices on a second SIM.

In an embodiment of the present disclosure, the data session or call for a secondary smart device linked with a primary smart device can be terminated at the primary smart device if the primary smart device is registered with a network and the secondary smart device is not registered with the network.

In another embodiment of the present disclosure, if primary smart device is not registered and secondary smart device is registered then data session or call can be terminated at secondary smart device.

In an embodiment of the present disclosure, among the plurality of devices linked together, the primary and secondary smart devices may be indicated by a user.

In an embodiment of the present disclosure, the data session or call for secondary smart device linked with primary smart device can be terminated at primary smart device if the primary smart device is registered with network, secondary smart device is registered with network and both primary device/secondary smart device are in proximity i.e. under same MME or when there is an indication from either of devices to network when they are paired through proximity interface.

In an embodiment of the present disclosure, the secondary smart device may transmit, to a network, an indication for switching an ongoing data session or call, and when the secondary smart device nears the primary smart device, a data session or call may be terminated at the primary smart device. Since linking information is available with a network, the secondary smart device does not need to transmit the identity of the primary smart device in the indication. In another embodiment, the secondary smart device may transmit the identifier of the primary smart device along with indication.

Figure 2:
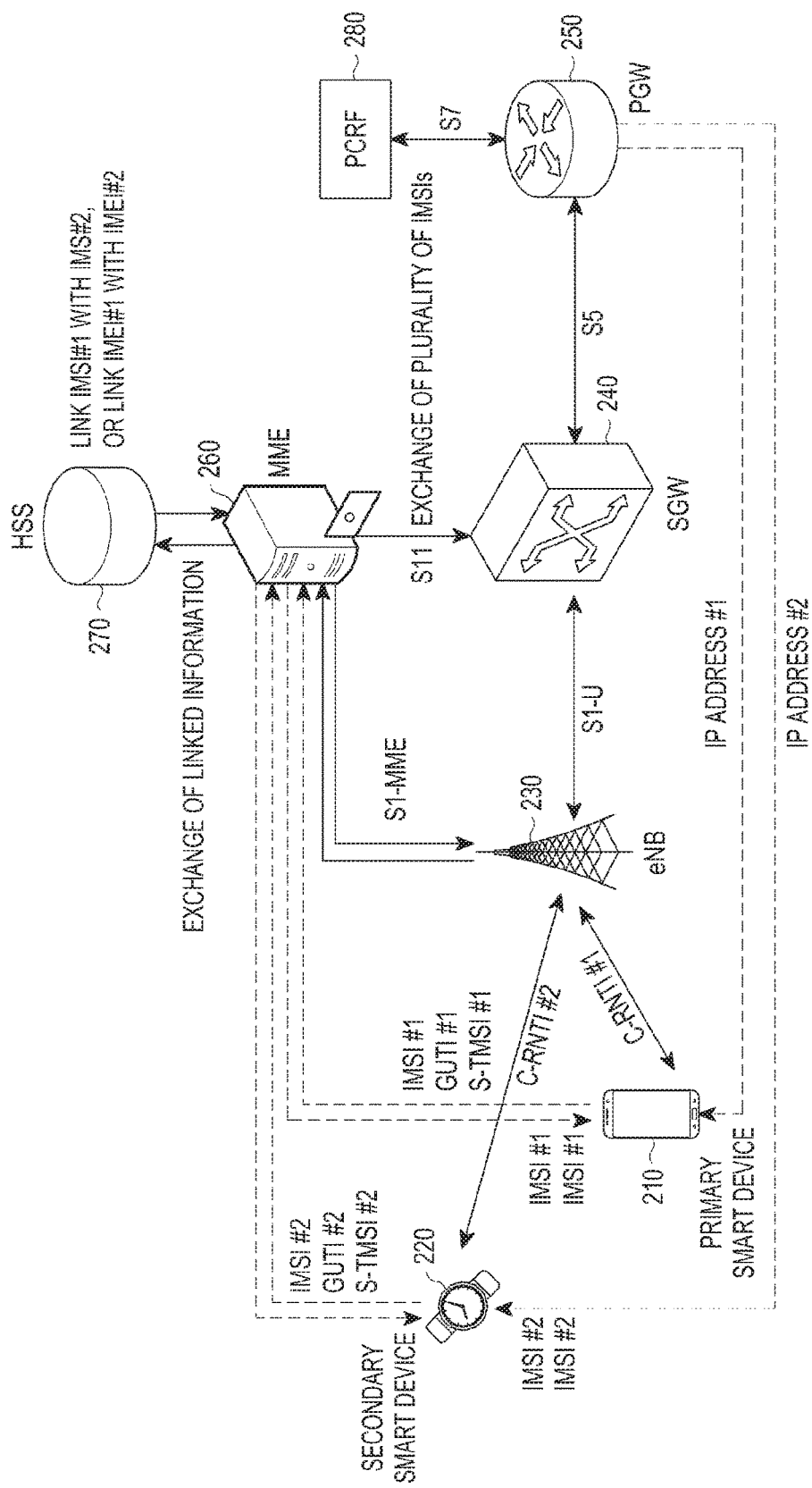
FIG. 2 is a diagram illustrating a plurality of smart devices having cellular radio capability assigned with different UE identifiers by different network elements according to an embodiment of the present disclosure.

FIG. 2 is a diagram illustrating a plurality of smart devices having cellular radio capability assigned with different UE identifiers by different network elements in a cellular network according to an embodiment of the present disclosure.

The smart device having a SIM has subscription-related information stored in the SIM, which is a security environment in the device. The subscription-related information includes a basic security key and an international mobile subscriber identity (IMSI), assigned by the operator/service provider. The IMSI is a permanent identifier that is assigned by the operator/service provider and is valid while the service is available for the operator/service provider. The IMSI is stored on the SIM/USIM card inside the device and HSS 270. The IMSI globally-uniquely identifies a user on a 3GPP PLMN. Since the IMSI is a permanent identifier associated with the user, it can be used for linking purposes in a network. As shown in FIG. 2, a primary smart device 210 has IMSI #1 stored in SIM/USIM of the primary smart device itself and a secondary smart device 220 has IMSI #2 stored in SIM/USIM of the second smart device itself.

Figure 3:
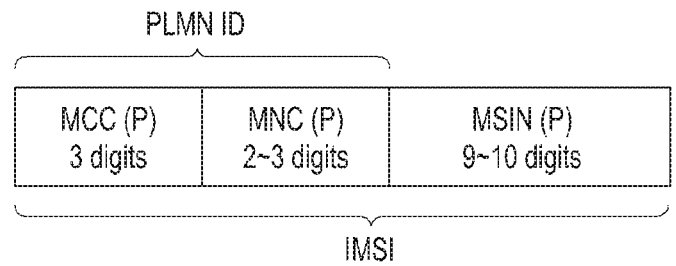
FIG. 3 is a diagram illustrating a configuration of international mobile subscriber identity (IMSI) according to an embodiment of the present disclosure.

FIG. 3 shows the configuration of the IMSI. As shown in FIG. 3, the IMSI includes a three-digit mobile country code (MCC), a two or three-digit mobile network code (MNC), and a 9 to 10-digit mobile subscriber identification number (MSIN). Thus, the IMSI is a maximum of 16 digits and globally unique. Within the same country, all IMSIs associated with users in the corresponding country have the same MCC. Within the same PLMN of the corresponding country, all IMSIs associated with users of the corresponding PLMN have the same MCC and MNC. The MCC and MNC together form the PLMN ID of the operator/service provider. Users of different operators/service providers, i.e. different PLMNs of the corresponding country have different MNCs but have the same MCC. In the same country, each user has a unique MSIN regardless of the PLMN. From a non-expert point of view, MSIN is a user's mobile phone number that the user dials to make a call. In general, the IMSI is not shared on the radio interface for security reasons, but can be shared by a smart device when the user makes an initial connection to the network.

The international mobile equipment identity (IMEI) is a permanent identifier assigned by a device manufacturer of the smart device. The IMEI is valid as long as the device is in use. The IMEI is stored in the device hardware and HSS

270. The IMEI is configured with a length of 15 digits including an eight-digit type allocation code (TAC), a six-digit serial number (SNR), and a one-digit check digit (CD). The IMEI software version (SV) is 16 digits including a TAC (8 digits), SNR (6 digits), and software version number (2 digits). The IMEI globally and uniquely identifies a device in use and since it is a permanent identifier associated with a device it can be used for linking purpose in the network.

As shown in FIG. 2, the primary smart device 210 has IMEI #1 stored in its device hardware, and the secondary smart device 220 has IMEI #2 stored in its device hardware. In specific implementations, it is possible to link the primary smart device 210 and the secondary smart device 220 by the HSS 270 based on the IMSI or IMEI, and in other implementations, the primary smart device 210 and the secondary smart device 220 may be linked based on a combination of the IMSI and the IMEI. That is, IMSI#1 and IMEI#1 of the primary smart device 210 may be linked with IMSI#2 and IMEI#2 of the secondary smart device 220. In an embodiment of the present disclosure, the primary smart device 210 and the secondary smart device 220 may be linked with each other, on the basis of one of the IMSI associated with the user subscription and the IMEI associated with a device including the SIM/USIM in which the user subscription information is stored, or a combination thereof.

As shown in FIG. 2, when a smart device is connected to a cellular network of a radio interface, a cell radio network temporary identity (C-RNTI) is assigned by an eNB 230. The C-RNTI is a temporary unique identifier of an eNB level which is valid only while the user/device is served by the cell being processed by the corresponding eNB. When the user/device moves from the eNB#1 to the eNB#2, the C-RNTI is changed. Because the C-RNTI is a temporary identifier associated with the user/device, it cannot be used for linking purposes in a network. As shown in FIG. 2, the primary smart device 220 and the secondary smart device 210 are served by the same eNB 230, which has assigned C-RNTI#1 and C-RNTI#2 to the devices, respectively.

Smart devices perform packet data exchange for one or more applications running on the corresponding device, using data bearers established in the cellular network for the corresponding device. On the radio interface between the device and the eNB, a data radio bearer (DRB) is established for user plane data processing. In addition, a packet S1 bearer is established between the eNB 230 and a serving gateway (SGW) 240 in order to perform packet transmission on the S1-U interface. The eNB 230 maintains a mapping between an S1 bearer and a DRB of a particular user/device in order to perform data packet processing. Further, an S5 bearer is established between the SGW 240 and a PDN gateway (PGW) 250, in order to perform packet transmission on the corresponding interface. The SGW 240 maintains a mapping between the S1 bearer and the S5 bearer of a particular user/device in order to perform data packet processing. An end-to-end bearer established for a user/device in a cellular network of a radio access network and a core network is referred to as an EPS bearer. In next generation cellular systems, i.e. 5G system, the DRB is established on the NR radio interface for user plane data handling while between the gNB and data gateway QoS flows are used for packet transfer on the NG-U interface. The gNB does the mapping of QoS flows to DRB depending on the QoS profile of the flows. Further, in the 5G CN, there is mapping of QoS flows and IP flows. The PGW is responsible for assignment of IP addresses to the user/device which can be one of IPv4 and IPv6 formats. The IP address is a dynamic identifier which is assigned to the user/device by the PGW. The IP address is valid as long as the user/device is registered with the cellular network (also called EPC). The IP address is stored in the device and the PGW, and it is known to any other node "north" of the PGW (i.e. external network elements like routers connected to PGW). It is not required to know the user/device IP address by the SGW or the eNB. When a data packet destined to user/device addressed by the IP address lands at the PGW, the packet is routed to the user/device using the established end-to-end EPS bearers or the QoS flows within the cellular network. As shown in FIG. 2, the primary smart device 210 and the secondary smart device 220 are assigned IP address #1 and IP address #2, respectively, by the PGW. Since the IP address is dynamically assigned, when the user/device is not registered or is re-registered, the IP address may be changed and may not be useful for linking devices. However, the IP address of the user/device may be useful for improvement of receipt of incoming calls.

When the user/device registers on the network using the ATTACH procedure, along with the assignment of IP address by PGW, C-RNTI by eNB the user/device is also assigned a globally unique temporary identity (GUTI) by the MME. The GUTI is a dynamic identifier assigned by the MME. The GUTI is valid as long as the user/device is registered with the EPC and the GUTI is connected to the assigned MME 260. This GUTI is stored in a device and the MME 260. During the user/device registration process, the MIME 260 creates a user/device context referred to as "UE Context" which holds the user subscription information fetched from the HSS 270 during the authentication procedure. The "UE Context" is tagged with the GUTI assigned by the MME to the user/device. The creation of the "UE Context" in the MME 260 eliminates the need for referring to the HSS 270 whenever some procedures are performed, such as the establishment of bearers.

Figure 4:
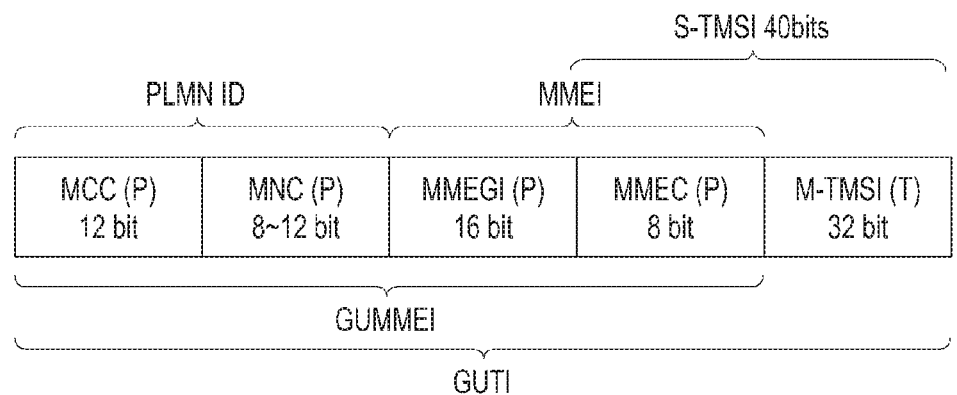
FIG. 4 is a diagram illustrating a configuration of globally unique temporary identity (GUTI) according to an embodiment of the present disclosure.

As shown in FIG. 2, the primary smart device and secondary smart device are assigned GUTI#1 and GUTI#2 respectively by the MME 260. The GUTI has a length of 76 to 80 bits, and the configuration thereof is as shown in FIG. 4. In FIG. 4, a field indicated by P represents a permanent part, and a field indicated by T represents a temporary part. The GUTI includes a permanent part referred to as "GUM-MEI" and a temporary part referred to as MME temporary mobile subscriber identity (M-TMSI). The GUMMEI, corresponding to the permanent part, consists of a PLMN ID and an MMEI. As described above, the PLMN ID consists of an MCC and an MNC. Depending on whether the MNC is 2 or 3 digits, the PLMN ID is 20 bits or 24 bits. The MMEI consists of a 16-bit MIME group identifier (MMEGI) and an 8-bit MIME code (MMEC). During mobility of the device/user within the same PLMN if the MIME handling the device changes, then a new GUTI is assigned to the device/user by a new MME. The M-TMSI which is temporary part normally changes when the GUTI is changed while the GUMMEI remains unchanged. However, if the user/device moves between two different PLMN then GUMMEI will also change. Even though the GUTI assigned to the user/device changes it is still possible to use the GUTI in combination with IMSI for linking the smart devices. In such an implementation the linking information based on GUTI needs to be updated every time the GUTI is changed. In an embodiment of the present disclosure, the primary smart device and the secondary smart device may be linked with each other based on combination of one of: IMSI associated with the user subscription and GUTI assigned to the user/device by the MME. In an embodiment of the present disclosure, linking information associated with the primary smart device 210 and the secondary smart device 220 may be stored and maintained in at least one additional network element, such as the MME 260 and PCRF 280, separately from the HSS 270. When the linking information is based on the GUTI, "UE Context" which is locally generated by the MME 260 can be linked to the primary smart device 210 and the secondary smart device 220. The linking information maintained at the MME 260 may be used to achieve signaling reduction in a network, in which the MME 260 aligns the paging opportunity for the linked devices, the MME 260 performs paging only of the primary smart device 210 on behalf of the secondary smart device 220, or a single TAU procedure may be executed by the primary smart device 210 rather than all linked devices.

In order to create linking information for a plurality of devices belonging to the same user or a user group, an operator/service provider may provide a web interface, an interactive voice response (IVR), or an automatic response system (ARS), or some other mechanism through which the user interested in linking the devices just provides the MSIN (i.e. mobile phone number) of the devices to be linked. The MSIN provided to devices to be linked is used by the operator/service provider to fetch the subscriber information in the HSS 270 associated with the MSIN and to create links of devices according to policies defined by the operator/service provider. In other implementations, when a user takes a subscription offer, the operator/service provider may provide the previously linked primary smart device (e.g., smart phone) 210 and secondary smart device (e.g., smart watch) 220.

As shown in FIG. 4, the MMEC and M-TMSI fields in the GUTI assigned to the user/device form S-TMSI (40 bits). Therefore, the S-TMSI remains valid as long as the GUTI remains valid. The S-TMSI is used by the MME in the paging message that is transmitted to the user/device. By aligning the paging opportunities of the linked devices, the primary smart device will wake-up only during its own paging opportunity to check paging messages for the primary smart device itself and one or more secondary smart devices. By aligning the paging opportunities of linked devices, the power consumption of primary smart device remains same even if it is monitoring paging messages on behalf of one or more secondary devices during its own paging opportunity. If the paging opportunities are not aligned, then the primary smart device needs to wake up during its own paging opportunity and additionally during the paging opportunity of the secondary smart device which would slightly increase the power consumption of the primary device.

Figure 5:
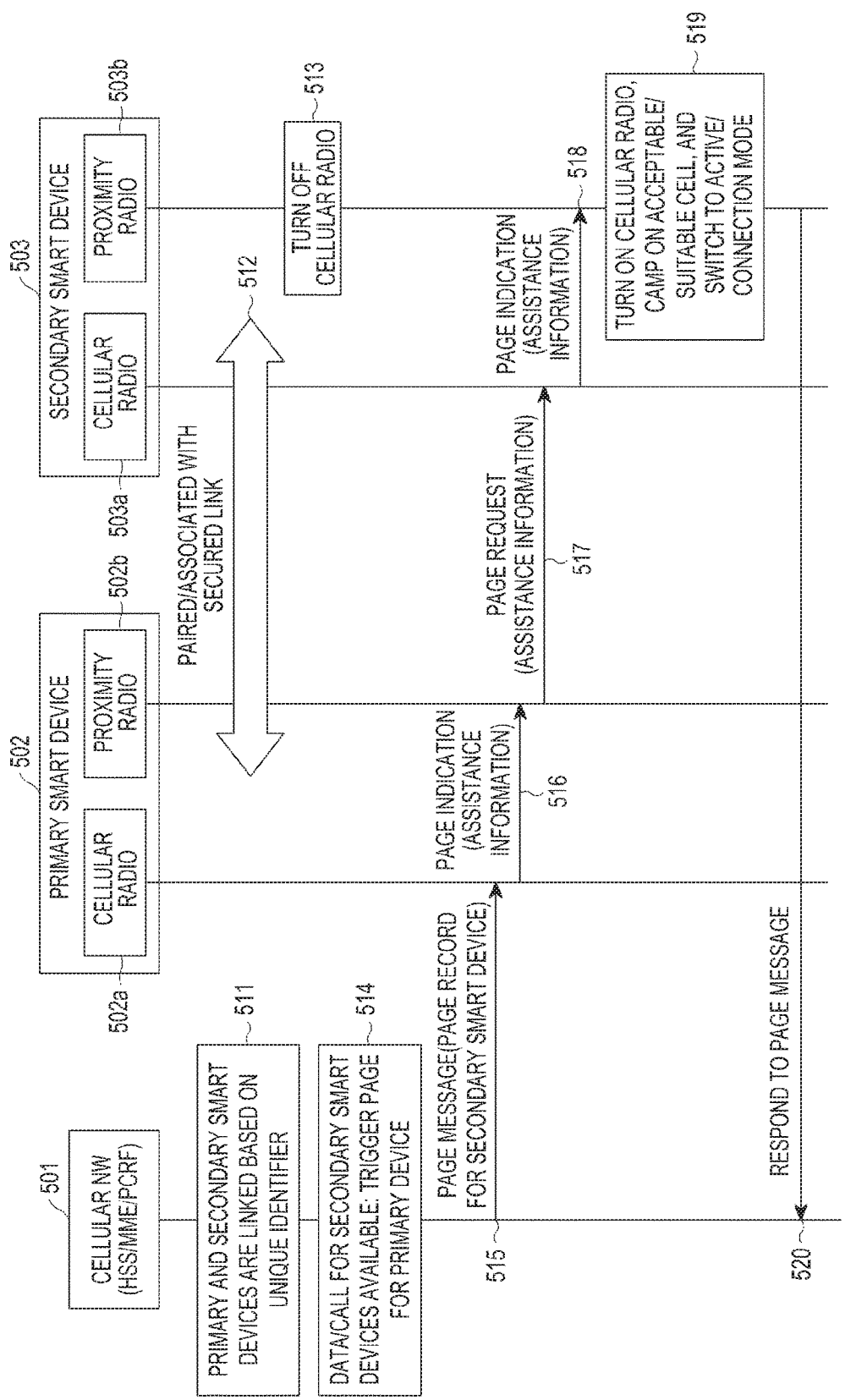
FIG. 5 is a diagram of a message sequence flow illustrating a paging procedure on behalf of a secondary smart device according to an embodiment of the present disclosure.

FIG. 5 is illustration of message sequence flow depicting the paging procedure on behalf of secondary smart device according to an embodiment of the present disclosure.

A primary smart device 502 and a secondary smart device 503 are linked, in a network, based on a unique identifier, such as IMSI, a combination of unique identifiers, such as IMSI and IMEI, or a combination of unique identifiers, such as IMSI and GUTI (511). Linking information between the primary smart device 502 and the secondary smart device 503 is available at one or more network elements of a core network 501, such as an MME, PCRF, etc., separately from the HSS. When the secondary smart device 503 is near the primary smart device 502, the secondary smart device 503 is paired with the primary smart device 502 using a proximity interface 503*a*, such as Bluetooth or Wi-Fi (512). After the pairing procedure has been completed, the secondary smart device 503 may share its GUTI or S-TMSI with the primary smart device 502 on the secure proximity interface 503*a*. In an embodiment of the present disclosure, the secondary smart device 503 shares its own UE identifier, such as GUTI or S-TMSI, with the primary smart device 502 on the secure proximity interface 503*a*. While the secondary smart device 503 is paired with the primary smart device 502, the cellular radio capability of the secondary smart device 503 can be turned off 513 to save power. In the case of a mobile incoming call or downlink data, addressed to the secondary smart device 503 identified in the core network (i.e., MME) 501, it is identified that the secondary smart device 503 is linked with the primary smart device 502 and a paging message is transmitted to the primary smart device 502 on behalf of the secondary smart device 503. The MME 501 prepares a paging message that includes a paging record for the secondary smart device 503, which includes the S-TMSI associated with the secondary smart device 503 (514). In an embodiment of the present disclosure, when the secondary smart device 503 and the primary smart device 502 are linked and the linking information is available in the core network 501 (514), the paging message for the secondary smart device 503 is transmitted to the primary smart device 502 on behalf of the secondary smart device 503 (515). In addition, the MME 501 transmits a paging message to all eNBs in the tracking area as reported by the primary smart device 502 in its previous tracking area update (TAU) message. Upon receiving the paging message from MME on S1-MME interface, the receiving eNB's forward the paging message on the radio interface. Since the primary smart device 502 is linked with the secondary smart device 503, the primary smart device 502 monitors the paging channel during its own paging opportunity and during the paging opportunity of the secondary smart device 503, which may be different from the paging opportunity of the primary smart device. The paging message is scheduled in the PDSCH addressed by the common P-RNTI of the PDCCH on the radio interface. The paging message includes paging records for some users/devices identified by the S-TMSI of the user/device that has been paged. Since the primary smart device 502 knows the S-TMSI of the secondary smart device 503, the primary smart device can identify the paging record associated with the secondary smart device 503 in the paging message. The paging opportunities of the primary smart device 502 and the secondary smart device 503 may not be aligned. The primary smart device 502 needs to be woken up during its own paging opportunity and during the paging opportunity of the secondary smart device 503, which slightly increases the power consumption of the primary smart device 503. In an embodiment of the present disclosure, the primary smart device 502 monitors the paging channel during its own paging opportunity and the paging opportunity of the secondary smart device 503, which may differ from the paging opportunity of the primary smart device. Upon identifying the paging record associated with the secondary smart device 503, the primary smart device 502 transmits a page indication message including some pieces of assistance information to the secondary smart device 503 through a proximity interface 502*b* (516, 517, and 518). The page indication message is transmitted, as a container, through the proximity interface 502*b*. Upon receiving the page indication message and the assistance information, the secondary smart device 503 responds to the network paging message (520) by turning on cellular radio, camping on a suitable cell, and switching to connection mode (519). The assistance information may include a paging record that is decoded by the primary smart device 502, and may also include some channel access parameters that may assist the secondary smart device 503 in performing quick cell selection. In an embodiment of the present disclosure, when the primary smart device 502 identifies the paging record associated with the secondary smart devices, the primary smart device transmits a page indication message including some pieces of assistance information to the secondary smart devices.

Various steps described above in FIG. 5 illustrate a generalized procedure in which a primary smart device performs paging on behalf of a secondary smart device. Accordingly, some of the steps may be combined, the order of some steps may be modified, or some steps may be omitted within an extent that does not deviate from the scope of the illustrated procedure of the present disclosure.

Figure 6:
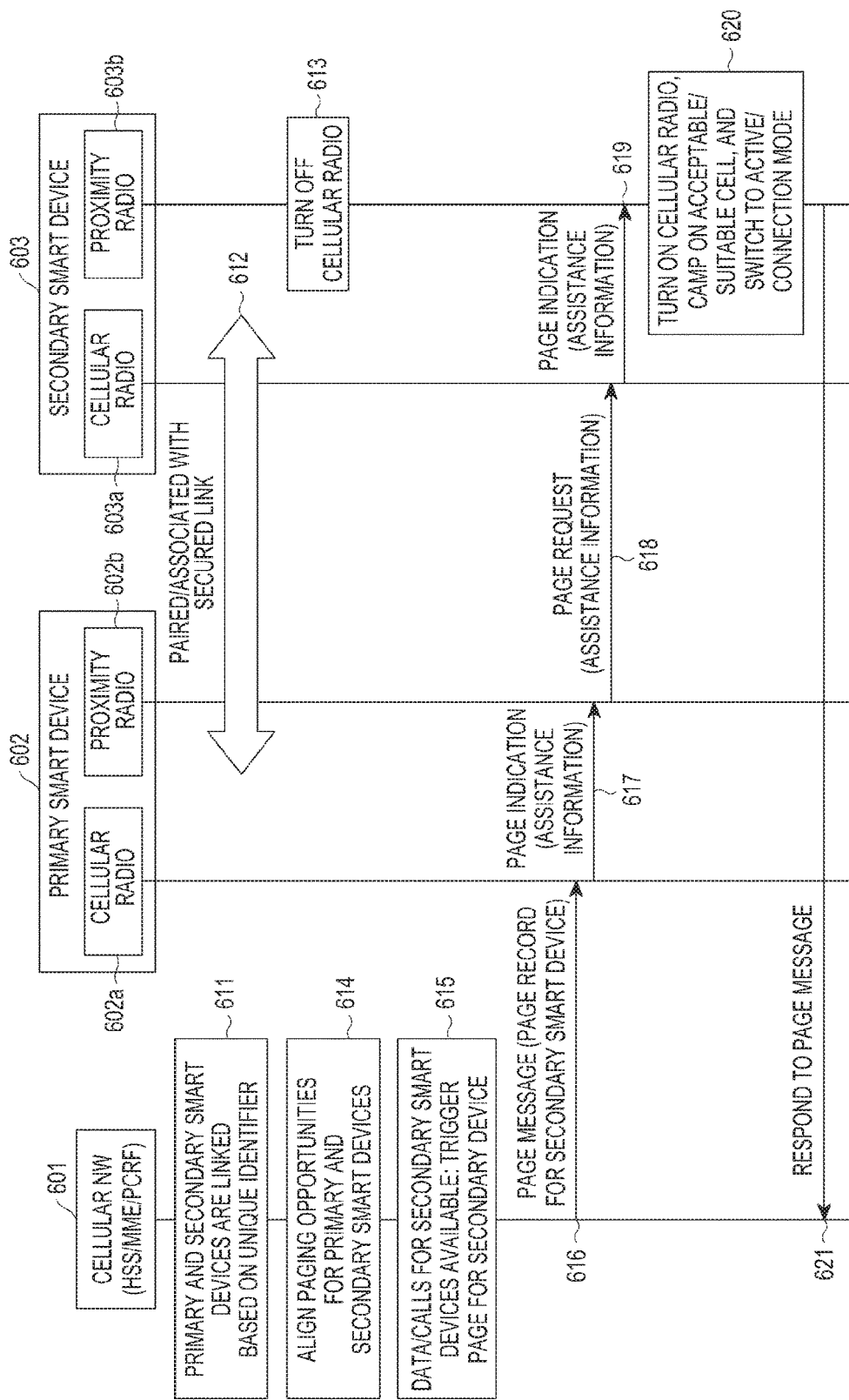
FIG. 6 is a diagram of a message sequence flow illustrating a paging procedure on behalf of a secondary smart device according to another embodiment of the present disclosure.

FIG. 6 is a message sequence flow diagram illustrating a paging procedure, performed by a primary smart device on behalf of a secondary smart device according to an embodiment of the present disclosure.

In FIG. 6, the paging opportunities of the linked primary smart device and secondary smart device are aligned (614). The steps of FIG. 6 are similar to the steps described in FIG. 5 except that the paging opportunities of the linked devices are aligned, therefore redundant explanations are omitted. According to the procedure 614 of aligning the paging opportunities of the linked devices, the primary smart device 602 will wake-up only during its own paging opportunity, thereby checking paging messages for the primary smart device itself and paging messages for one or more secondary smart devices. In addition, even when the primary smart device 602 monitors paging messages during its own paging opportunity on behalf of one or more secondary smart devices, according to the procedure 614 of aligning the paging opportunities of the linked devices, the power consumption by the primary smart device 602 is kept the same. In an embodiment of the present disclosure, the paging opportunities of the primary smart device 602 and the secondary smart device 603 are aligned by the network 601 based on linking information.

Figure 7:
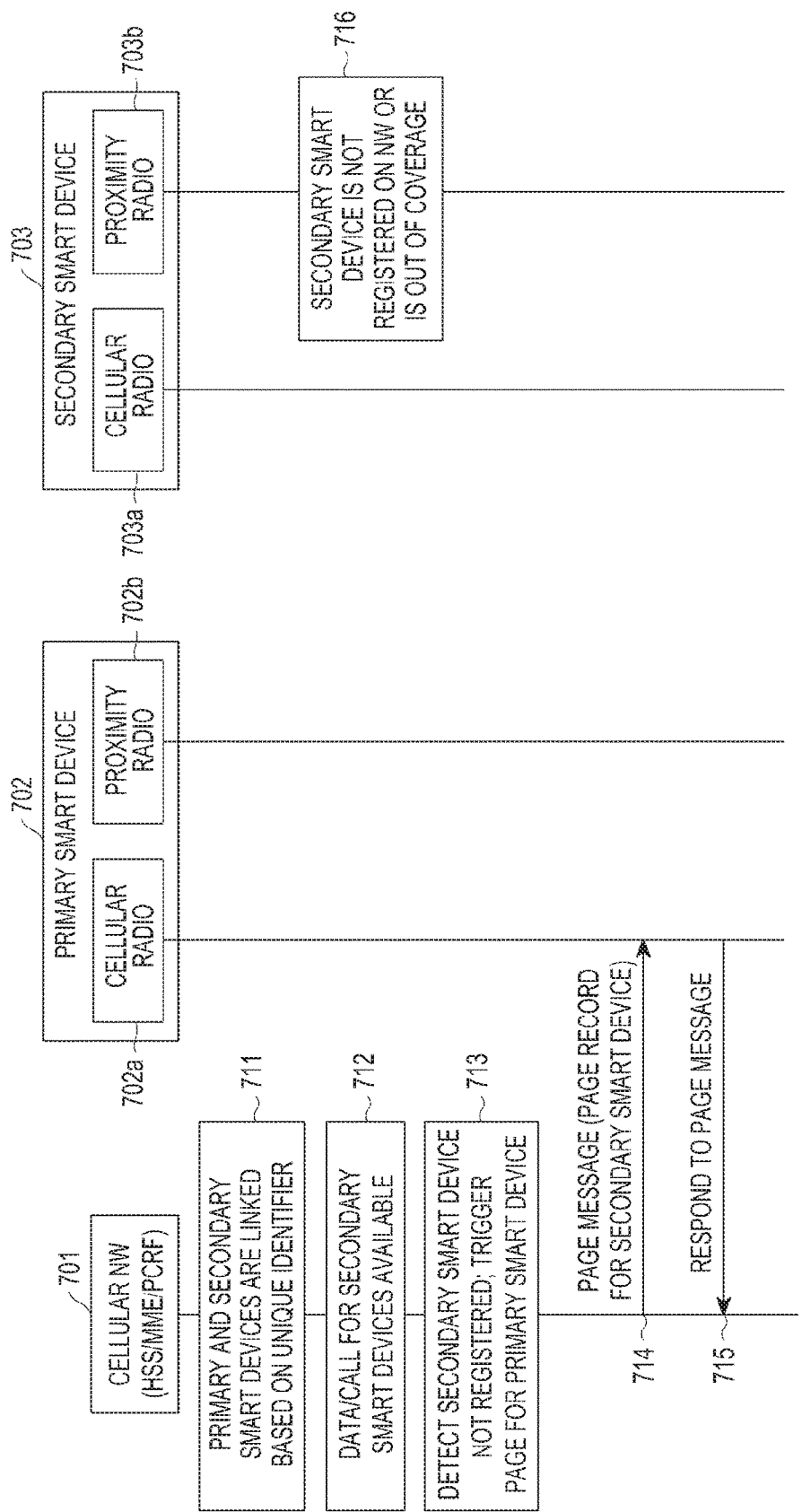
FIG. 7 is a diagram illustrating the call termination on behalf of a secondary smart device according to an embodiment of the present disclosure.

FIG. 7 is a diagram illustrating an incoming-call-handling process, performed by a secondary smart device on behalf of a primary smart device, according to an embodiment of the present disclosure.

A primary smart device 702 and a secondary smart device 703 are linked in a network 701 on the basis of a unique identifier, such as IMSI, a combination of unique identifiers, such as IMSI and IMSI, or a combination of unique identifiers, such as IMSI and GUTI (711). Linking information between the primary smart device 702 and the secondary smart device 703 is available in one or more network elements of the core network 701, such as MME, PCRF, etc., separately from the HSS. The primary smart device 702 is registered with a cellular network 701, and the MME 701 makes an acknowledgment of the existence of the primary smart device 702 based on the previous TAU procedure performed by the primary smart device 702. However, the secondary smart device 703 is not registered with the network 701 (716), or the existence of the secondary smart device 703 is not known to the network 701. In the event where a data session or call, which is addressed the secondary smart device 703, is identified by the core network (that is, MME) 701, the network 701 detects that the secondary smart device 702 is not registered and the data session or call is received according to the embodiments disclosed herein (712). The MME 701 triggers a paging message for the primary smart device 702, based on the linking information (713). The MME 701 may prepare a paging message including S-TMSI associated with the secondary smart device 703 and a paging record for the secondary smart device 703, which includes a cause value that indicates that the secondary smart device 703 is not registered or is out of a coverage area. In an embodiment of the present disclosure, the network 701 triggers a paging message for the primary smart device 702 based on the linking information (713), where the paging message includes S-TMSI associated with the secondary smart device 703, and a paging record for the secondary smart device 703, which includes a cause value that indicates that the secondary smart device 703 is not registered or is out of a coverage area. The MME 701 transmits a paging message to all eNBs in the tracking area as reported by the primary smart device 703 in its previous tracking area update (TAU) message. The eNBs having received the paging message from the MME on the S1-MME forwards the paging message on the radio interface. In addition, since the primary smart device 702 is also linked with the secondary smart device 702, the primary smart device 702 monitors a paging channel for the primary smart device itself and monitors a paging channel in replace of the secondary smart device 702 (714). Since the primary smart device 702 knows the S-TMSI of the secondary smart device 703, the primary smart device 702 can identify the paging record associated with the secondary smart device 703 in the paging message, and can detect a cause value included in the paging message. Since the secondary smart device 703 cannot reach the network 701, the data session or call can be terminated at the primary smart device 701, as a response to the paging message, based on the cause value (715).

FIG. 7 shows an incoming call to the primary smart device 702 when the secondary smart device 703 is not registered with the network 701 or is out of a coverage area. However, when the primary smart device 702 is not registered with the network 701 or is out of a coverage area, a call may be terminated at the secondary smart device 703 based on the linking information. In an embodiment of the present disclosure, the network 701 triggers a paging message for the secondary smart device 703 based on the linking information, and the paging message includes an S-TMSI associated with the primary smart device 702 and a paging record for the primary smart device 702, which includes at least the cause value indicating that the primary smart device 702 is not registered or is out of a coverage area. In addition, the procedure may also be applied to a procedure of receiving, by the primary smart device 702, a data session or call for the secondary smart device 703, in which the secondary smart device 703 is linked to the primary smart device 702, the primary smart device 702 is registered with the network 701, and the secondary smart device 703 is registered with the network, whereas the case where the primary smart device 702 and the secondary smart device 703 are close to each other (i.e., belonging to the same MME) or the case where devices are paired to each other through a proximity interface corresponds to the case where there is an indication from one of the smart devices. The cause values included in the paging record are sufficient to handle all incoming-call scenarios that have been described in the present disclosure.

Various steps described above in FIG. 7 illustrate a generalized procedure in which a call is forwarded to a primary smart device on behalf of a secondary smart device. Accordingly, some of the steps may be combined, the order of some steps may be modified, or some steps may be omitted within an extent that does not deviate from the scope of the illustrated procedure of the present disclosure.

Figure 8A:
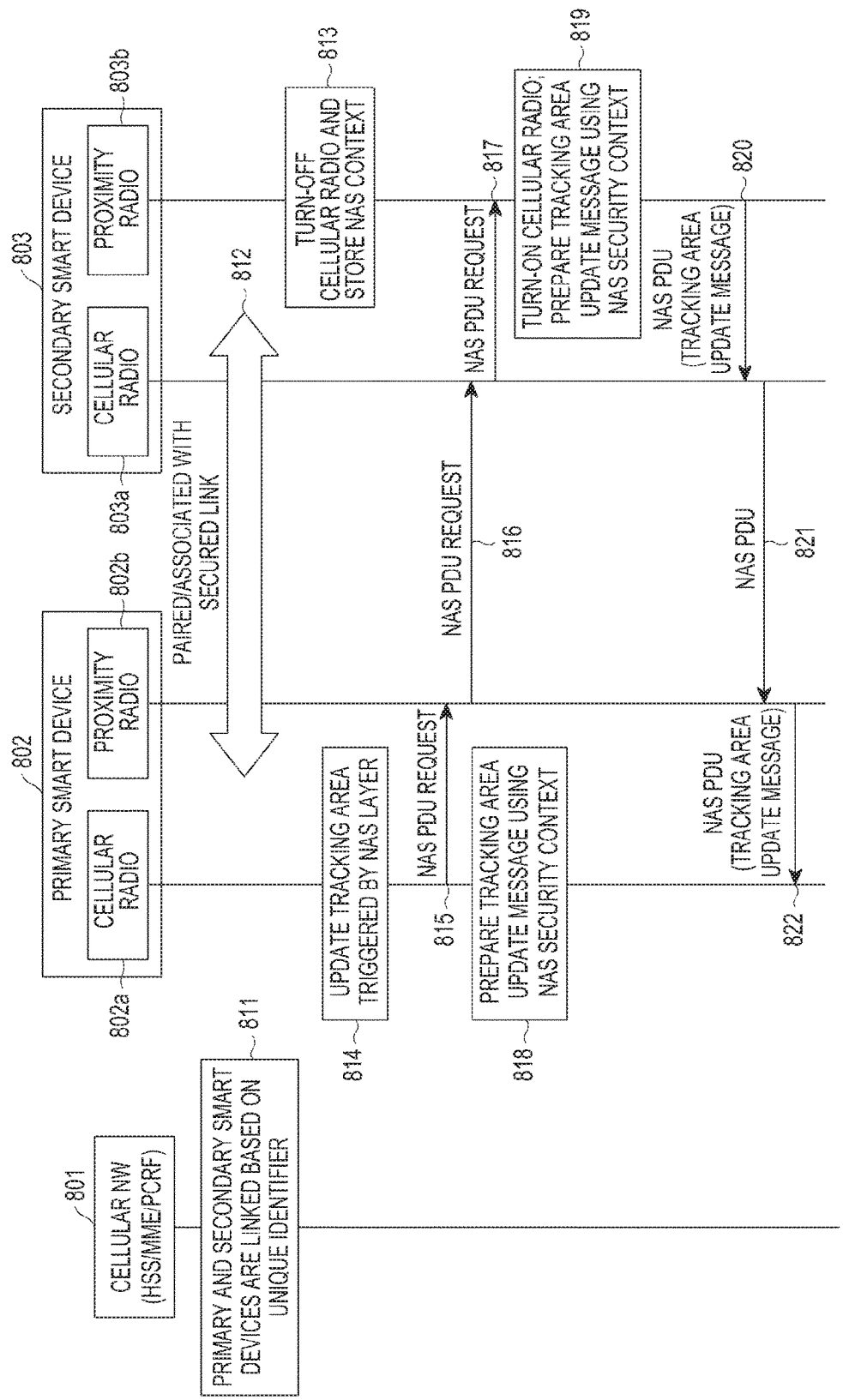
FIGS. 8A and 8B are diagrams of message sequence flows illustrating a tracking area update procedure on behalf of a secondary smart device according to an embodiment of the present disclosure.
Figure 8B:
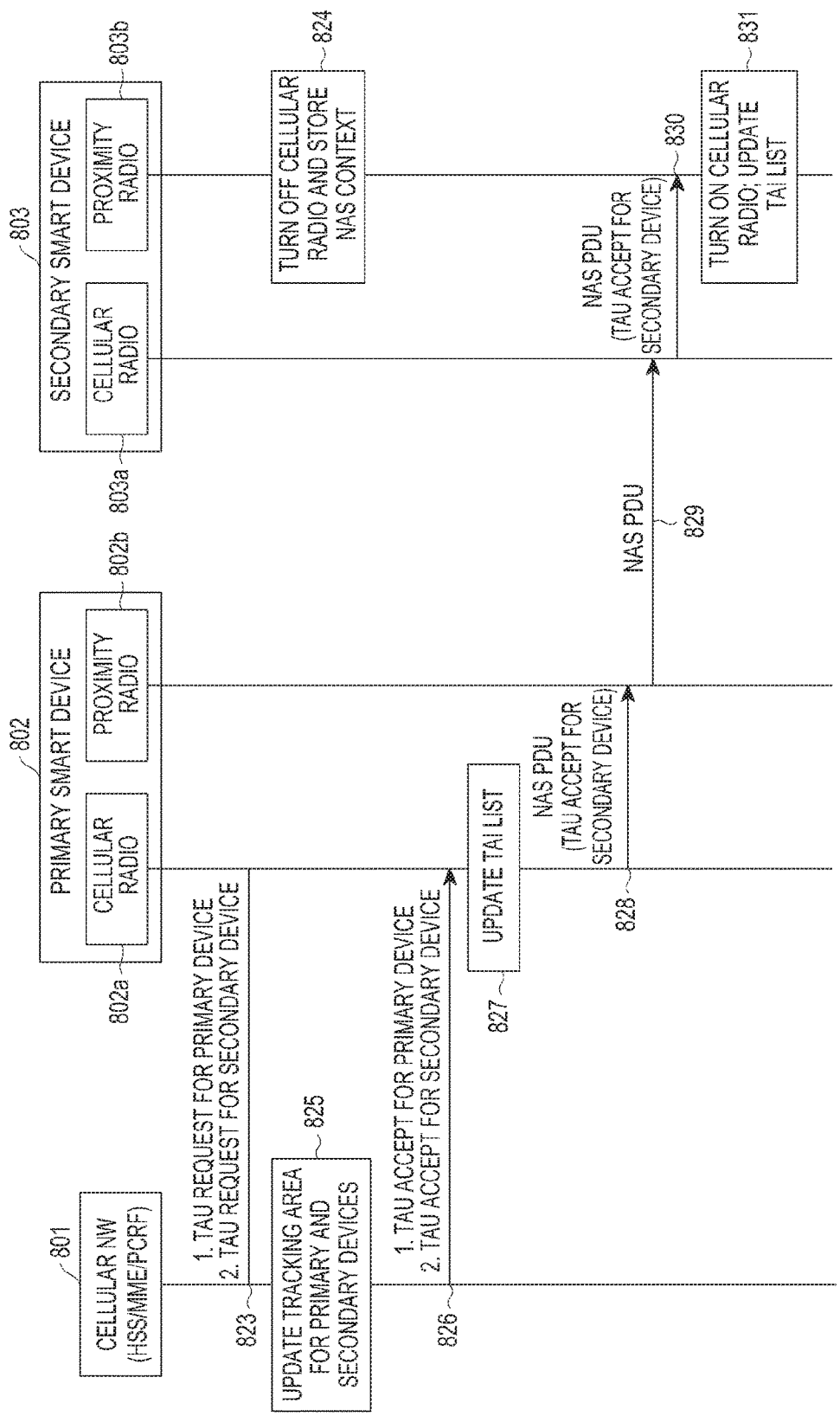

FIGS. 8A and 8B are diagrams illustrating a message sequence flow of a tracking area update procedure performed by a primary smart device on behalf of a secondary smart device according to an embodiment of the present disclosure.

A primary smart device 802 and a secondary smart device 803 are linked in a network 801, based on a unique identifier, such as IMSI, a combination of unique identifiers, such as IMSI and IMEI, or a combination of unique identifiers such as, IMSI and GUTI (811). Linking information between the primary smart device 802 and the secondary smart device 803 is available in one or more network elements of a core network 801, such as an MME, PCRF, etc., separately from the HSS. When the secondary smart device 803 is in the vicinity of the primary smart device 802, the secondary smart device 803 is paired with the primary smart device 802 by using proximity interfaces 802*b* and 803*a*, such as Bluetooth or Wi-Fi (812). After the pairing procedure has been completed, the secondary smart device 803 may share its GUTI or S-TMSI with the primary smart device 802 through secure proximity interfaces 802*b* and 803*a*. While the secondary smart device 803 is paired with the primary smart device 802, the cellular radio capability of the secondary smart device 803 is turned off (813), and therefore the power of the secondary smart device 803 can be reduced. During turn-off of the secondary smart device, the cellular radio 803*b* of the secondary smart device 803 stores NAS context (813). That is, the NAS security keys are stored for a period of time equal to the lifetime of the associated keys. During the movement of the paired devices, the NAS layer of the primary smart device 802 may trigger the TAU procedure, for example, when the primary smart device 803 moves out of a tracking area identity (TAI) list provided in the previous TAU procedure, or according to periodic TAU (814). When the TAU procedure is triggered, the primary smart device 802 transmits, to the secondary smart device 803, a request for transmitting a TAU request message of the primary smart device through the proximity interface 802*b* (815 and 816). Upon receipt of the request through the proximity interface 803*a* (816 and 817), the secondary smart device 803 turns on the cellular radio capability and prepares a TAU request message for applying the stored NAS context (819). The prepared TAU request message is transmitted to the primary smart device 802 as a NAS PDU in a container on the proximity interface 803*a* (820, 821, and 822). The primary smart device 802 prepares the TAU request message of the primary smart device itself, using its own NAS security keys. Then, the primary smart device 802 attaches the TAU request message of the primary smart device itself and the TAU request message terminated at the secondary smart device 803 through the proximity interface 802*b*. An attached message including an indication of the existence of a TAU request message for the linked device is transmitted to the cellular network 801 by the primary smart device 802 (823). In an embodiment of the present disclosure, when the primary smart device 802 and the secondary smart device 803 are connected through proximity interfaces 802*b* and 803*a* and when the TAU procedure is triggered by the NAS layer 802*a* of the primary smart device 802, the primary smart device 802 attaches the TAU request message of the primary smart device itself and the TAU request message terminated at the secondary smart device 803, where the attached messages are transmitted to the cellular network 801 together with a TAU request indication for the linked devices (823). The MIME 801 performs the tracking area update for the primary smart device 802 and the secondary smart device 803 (825), and responds as a TAU accept message for both the primary smart device 802 and the secondary smart device 803 (826). Upon receiving the TAU accept message, the primary smart device 802 updates the TAI list of the primary smart device itself in the NAS layer 802*a* (827), and forwards the TAU accept message for the secondary smart device 803, as a NAS PDU, through the proximity interface 802*b* (828, 829, and 830). Upon receipt of the NAS PDU including a TAU accept message, the secondary smart device 803 updates the TAI list (831). In an embodiment of the present disclosure, upon receiving a TAU accept message as a response to a TAU request message transmitted to the linked devices, the primary smart device 802 forwards the TAU accept message for the secondary smart device 803, as the NAS PDU, through the proximity interface 802*b* (828, 829, and 830).

Various steps described above in FIG. 8 illustrate a generalized procedure for a tracking area update procedure on behalf of the secondary smart device. Accordingly, some of these steps may be combined, the order of some of the steps may be modified, or some steps may be omitted within an extent that does not deviate from the idea of the illustrated procedure of the present disclosure.

Figure 9:
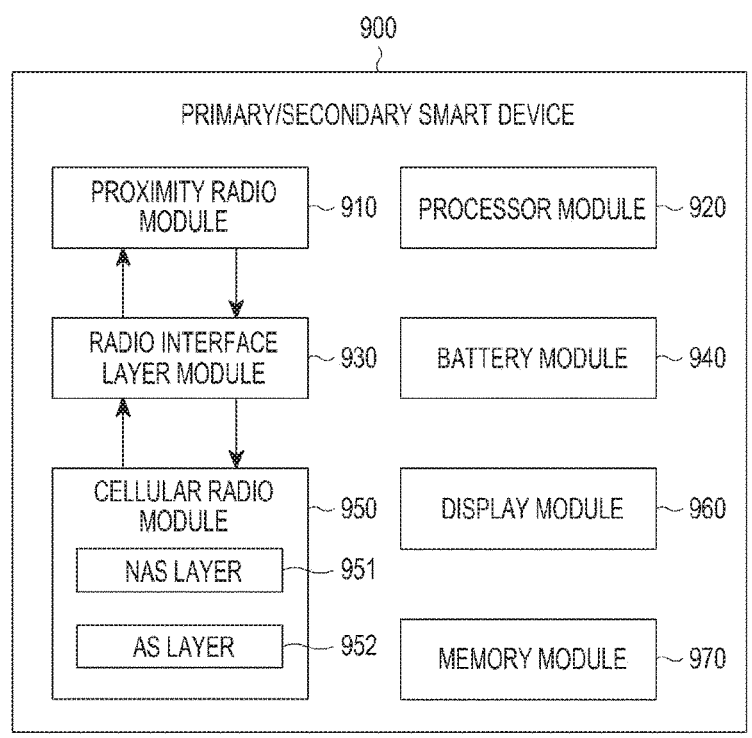
FIG. 9 is an exemplary diagram illustrating a block diagram of a primary smart device or secondary smart device according to an embodiment of the present disclosure.

FIG. 9 illustrates an example of a block diagram that includes hardware and software modules of a primary smart device and a secondary smart device for implementing methods disclosed in the present disclosure.

A primary/secondary smart device 900 includes a proximity radio module 910, a radio interface layer module 930, a cellular radio module 950, a processor module 920, a battery module 940, a memory module 970, and a display module 960. Although each module is shown as a separate block in FIG. 9, two or more modules may be combined into one module.

The proximity radio module 910 may be a low power radio module based on a Bluetooth standard and a Wi-Fi standard, or may be an LTE-based ProSe module. The proximity radio module 910 includes all hardware and software components needed to perform baseband and wireless operations, e.g., pairing, searching, association, and exchanging data, on proximity interfaces established with different proximate radios of the same type.

The radio interface layer module 930 may act as a coordinator between the proximity radio module 910 and the cellular radio module 950 so as to process messages between radio modules. Information from the cellular radio module 950 is included in a container prepared by a radio interface layer and transmitted, as application data, to the proximity radio module 910. The container received from the proximity radio module 910 is converted to appropriate access stratum information and non-access stratum information and transmitted to the cellular radio module 950. In an embodiment, the radio interface layer module 930 is configured to communicate messages between the proximity radio module 910 and the cellular radio module 950.

The cellular radio module 950 consists of all the hardware and software components necessary to perform baseband, radio, and protocol processing related operations on the interface with a cellular network. These operations are divided between an access stratum layer and a non-access stratum layer. The cellular radio module 950 may be based on LTE standard, UMTS standard, CDMA standard, 5G standard or any other cellular radio access technology. For example, in the smart device, an access stratum layer 952 of the cellular radio module 950 may be configured to receive the synchronization signal and system information from the cellular network to perform cell selection and cell reselection. In addition, the access stratum layer 952 may be configured to perform random access procedures on selected cells of the cellular network. The cellular radio module 950 may also be configured to transmit and receive data to and from the cellular network according to the specified physical layer waveform and coding for the associated radio access technology, for example, described in 3GPP specification or IMT Advanced System specified in IMT 2020 system. Similarly, the non-access stratum layer 951 of the cellular radio module 950 may be configured to transmit and receive, to and from a cellular network, a tracking network update request, accept messages, and other NAS level messages according to protocol level messages specified in the associated radio access technology.

The processor module 920 represents a computing environment in a smart device for implementing a method and system for linking smart devices according to the embodiments disclosed in the present specification. The computing environment may include at least one control device having a control unit and an arithmetic logic unit (ALU), a clock chip, a plurality of networking devices, and a plurality of input/output (I/O) devices. The processor module 920 is responsible for processing instructions of the algorithm. The control unit receives commands from the control unit and performs processing thereof. In addition, all logic and arithmetic operations associated with the execution of instructions are calculated with the help of the ALU. The overall computing environment may comprise a plurality of homogeneous or heterogeneous cores, a plurality of different types of CPUs, special media, and other accelerometers. The control unit is responsible for processing the instructions of the algorithm. The algorithm comprising instructions and codes necessary for the implementation is stored in the memory module or a storage unit or both. When executed, the instructions may be fetched from the corresponding memory module or the storage unit and executed by the control unit. The control unit synchronizes operations and executes instructions based on the timing signals generated by the clock chip. Embodiments of the present disclosure may be implemented through at least one software program that is executed on at least one hardware device and controls components by performing management functions. The methods shown in FIGS. 5-8 include various units, blocks, modules, or steps described in connection with the methods, processors, algorithms, or systems of the present disclosure, and may be implemented by a combination of a general-purpose processor, a programming language, an application, and an embedded processor.

The battery module 940 of the smart device is responsible for powering the various modules shown in the block diagram. The battery module 940 hosts a battery, which is similar to a battery seen in smartphones or other smart devices, such as a smart watch which requires regular charging from a power source. One of the main purposes of a method for linking smart devices according to the embodiments disclosed in the present specification is to reduce battery power consumption in smart devices having short battery standby time. By implementing the disclosed methods in the respective devices, the battery standby time of the secondary smart device can be significantly improved.

The memory module 970 is configured to store information related to the operations of the smart device. The memory module may be configured to store NAS information, assistance information, etc., which are exchanged between devices.

The display module 960 may be configured so as to allow the user to recognize some operations of the smart device when the primary smart device performs a proxy operation according to a user's information input or information output on the display. Most of the operations performed by the primary smart device on behalf of the secondary smart device are transparent to the user and may not require user input or output on the display. However, mutual authentication between proximity radios of related devices may require user input or output through a display module.

According to the present disclosure described above, a plurality of cellular devices is linked in a core cellular network, based on unique identifiers associated with linked devices. When links of a plurality of cellular devices are established in a core cellular network, the first cellular device may act as a primary smart device and may be connected to other linked cellular devices acting as secondary smart devices through the proximity interface. The cellular network may page the primary smart device on behalf of the secondary smart device, for mobile incoming calls addressed to the secondary smart device, based on linking information between the cellular devices, so as to allow the secondary smart device to save battery power. In addition, when the primary smart device performs tracking area update with a cellular network of the primary smart device itself, it is possible to perform tracking area update for a plurality of secondary smart devices connected through the proximity interface.

Particular aspects of the present disclosure may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a CD-ROM, a magnetic tape, a floppy disk, an optical data storage device, and a carrier wave (such as data transmission over the Internet). The computer-readable recording medium may be distributed through computer systems connected to the network, and accordingly the computer-readable code is stored and executed in a distributed manner. Further, functional programs, codes, and code segments to achieve the goals of the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like)-readable storage medium for storing the program. Further, the program may be electronically carried by any medium such as a communication signal transferred through a wired or wireless connection, and the present disclosure appropriately includes equivalents thereof.

Further, an apparatus according to an embodiment of the present disclosure may receive the program from a program-providing device that is wiredly or wirelessly connected thereto, and may store the program. The program-providing device may include a program including instructions through which a program-processing device performs a preset content-protecting method, a memory for storing information and the like required for the content-protecting method, a communication unit for performing wired or wireless communication with the program processing device, and a controller for transmitting the corresponding program to a transceiver at the request of the program-processing device or automatically.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method for transmitting and receiving signals for a plurality of linked devices including a first device and a second device, the method comprising:
performing, by the first device, pairing with the second device through a proximity radio interface and sharing identification information of the second device;
receiving, by the first device, a paging message for the second device from a cellular network through a cellular radio interface;
determining, by the first device, whether the second device is registered on the cellular network based on a cause value included in the paging message; and
transmitting, by the first device, a page response message for the second device to the cellular network through the cellular radio interface in response to determining that the second device is not registered on the cellular network.

2. The method of claim 1, further comprising receiving, by the first device, a data session or call intended for the second device in response to transmitting the page response message to the cellular network through the cellular radio interface.

3. The method of claim 1, further comprising:
transmitting, by the first device, a non-access stratum (NAS) protocol data unit (PDU) request message to the second device through the proximity radio interface when a tracking area update procedure is triggered in the first device;
receiving, by the first device, a NAS PDU including a tracking area update message from the second device and transmitting, by the first device, a request for a tracking area update for the first and second devices to the cellular network through the cellular radio interface;
receiving, by the first device, a tracking area update accept message for the first and second devices from the cellular network and updating, by the first device, a tracking area identifier list; and
transmitting the tracking area update accept message for the second device, to the second device through the proximity radio interface.

4. The method of claim 1, wherein the first device monitors a paging channel during a paging opportunity of the first device and a paging opportunity of the second device in order to receive the paging message.

5. A method for transmitting and receiving signals for a plurality of devices, the method comprising:
linking, by a cellular network, a first device and a second device to each other based on unique identification information of the first device and the second device;
determining whether the first device or the second device is registered on the cellular network;
preparing, by the cellular network, a paging message based on the identification information of the second device, the paging message including a cause value indicating whether the first device or the second device is registered on the cellular network;
transmitting, by the cellular network, the paging message for the second device to the first device; and
receiving, by the cellular network, a response message from the first device when the second device is not registered on the cellular network.

6. The method of claim 5, further comprising aligning a paging opportunity of the first device and a paging opportunity of the second device before preparing and transmitting the paging message.

7. The method of claim 5, further comprising:
receiving a data session or call intended for the second device; and
transmitting the data session or call intended for the second device to the first device in response to receiving the response message from the first device.

8. The method of claim 5, further comprising:
receiving a request for tracking area update for the first device and the second device from the first device; and
updating tracking areas for the first device and the second device and transmitting a tracking area update accept message for the first device and the second device to the first device.

9. The method of claim 7, wherein the linking information is stored or maintained in at least one network element associated with the cellular network.

10. The method of claim 7, wherein the unique identification information includes at least one of international mobile subscriber identity (IMSI), international mobile equipment identity (IMEI), or globally unique temporary identity (GUTI).

11. A method for transmitting and receiving signals for a plurality of linked devices including a first device and a second device, the method comprising:
performing, by the second device, pairing with the first device through a proximity radio interface and sharing, by the second device, identification information of the second device with the first device;
turning off, by the second device, cellular radio capability;
receiving, by the second device, a paging message for the second device, which is transmitted from the cellular network, from the first device through the proximity radio interface;
determining, by the second device, whether the first device is registered with the cellular network based on a cause value included in the paging message;
receiving, by the second device, a data session or call intended for the first device when the first device is not registered with the cellular network; and
turning on, by the second device, the cellular radio capability to switch to a connection mode and transmitting, by the second device, a response message to the cellular network in response to the paging message.

12. The method of claim 11, further comprising:
receiving, by the second device, a non-access stratum (NAS) protocol data unit (PDU) request message from the first device through the proximity radio interface;

turning on, by the second device, the cellular radio capability, transmitting, by the second device, a NAS PDU including a tracking area request message to the first device through the proximity radio interface, and then turning off, by the second device, the cellular radio capability; and receiving, by the second device, a tracking area update accept message, which is transmitted from the cellular network, through the first device and turning on, by the second device, the cellular radio capability so as to update a tracking area identifier list.

13. A first device for transmitting and receiving signals for a plurality of linked devices, the first device comprising:
a proximity radio interface;
a cellular radio interface; and
a processor coupled with the proximity radio interface and the cellular radio interface, the processor configured to:
perform pairing with the second device through the proximity radio interface and share identification information of the second device,
receive a paging message for the second device from a cellular network through the cellular radio interface,
determine whether the second device is registered on the cellular network based on a cause value included in the paging message, and
transmit a page response message for the second device to the cellular network through the cellular radio interface in response to determining that the second device is not registered on the cellular network.

14. The first device of claim 13, wherein the processor is further configured to receive a data session or call intended for the second device in response to transmitting the page response message to the cellular network through the cellular radio interface.

15. The first device of claim 13, wherein the processor is further configured to:
transmit a non-access stratum (NAS) protocol data unit (PDU) request message to the second device through the proximity radio interface when a tracking area update procedure is triggered in the first device;
receive a NAS PDU including a tracking area update message from the second device and transmit a request for a tracking area update for the first and second devices to the cellular network through the cellular radio interface;
receive a tracking area update accept message for the first and second devices from the cellular network and update a tracking area identifier list; and
transmit the tracking area update accept message for the second device, to the second device through the proximity radio interface.

16. An apparatus of a cellular network for transmitting and receiving signals for a plurality of linked devices, the apparatus of a cellular network comprising:
a transceiver; and
a processor configured to:
link a first device and a second device to each other based on unique identification information of the first device and the second device,
determining whether the first device or the second device is registered on the cellular network,
prepare a paging message based on the identification information of the second device, the paging message including a cause value indicating whether the first device or the second device is registered on the cellular network,
control the transceiver to transmit the paging message for the second device to the first device, and
control the transceiver to receive a response message from the first device when the second device is not registered on the cellular network.

17. The apparatus of claim 16, wherein the processor is further configured to align a paging opportunity of the first device and a paging opportunity of the second device.

18. The apparatus of claim 16, wherein the processor is further configured to:
receive a data session or call intended for the second device; and
transmit the data session or call intended for the second device to the first device in response to receiving the response message from the first device.

19. The apparatus of claim 16, wherein the processor is further configured to:
control the transceiver to receive a request for tracking area update for the first device and the second device from the first device; and
update tracking areas for the first device and the second device and control the transceiver to transmit a tracking area update accept message for the first device and the second device to the first device.

20. A second device for transmitting and receiving signals for a plurality of linked devices, the second device comprising:
a proximity radio interface;
a cellular radio interface; and
a processor coupled with the proximity radio interface and the cellular radio interface, the processor configured to:
perform pairing with the first device through a proximity radio interface and share identification information of the second device with the first device,
turn off cellular radio capability,
receive a paging message for the second device, which is transmitted from the cellular network, from the first device through the proximity radio interface,
determine whether the first device is registered with the cellular network based on a cause value included in the paging message,
receive a data session or call intended for the first device when the first device is not registered with the cellular network, and turn on the cellular radio capability to switch to a connection mode and transmit a response message to the cellular network in response to the paging message.

* * * * *